(12) United States Patent
McClimond

(10) Patent No.: US 10,688,506 B2
(45) Date of Patent: Jun. 23, 2020

(54) FOAM GENERATOR INSERT

(71) Applicant: MR. FOAMER, LLC, Stuart, FL (US)

(72) Inventor: James T. McClimond, Jupiter, FL (US)

(73) Assignee: Mr. Foamer, LLC, Stuart, FL (US)

( * ) Notice: Subject to any disclaimer, the term of this patent is extended or adjusted under 35 U.S.C. 154(b) by 191 days.

(21) Appl. No.: 15/960,527

(22) Filed: Apr. 23, 2018

(65) Prior Publication Data

US 2018/0304285 A1 Oct. 25, 2018

Related U.S. Application Data

(60) Provisional application No. 62/488,477, filed on Apr. 21, 2017.

(51) Int. Cl.
| | |
|---|---|
| *B60S 3/04* | (2006.01) |
| *B05B 7/00* | (2006.01) |
| *B01F 3/04* | (2006.01) |
| *B01F 5/06* | (2006.01) |

(52) U.S. Cl.
CPC ........ *B05B 7/0043* (2013.01); *B01F 3/04446* (2013.01); *B01F 5/0612* (2013.01); *B01F 5/0697* (2013.01); *B01F 2215/004* (2013.01); *B60S 3/04* (2013.01)

(58) Field of Classification Search
CPC .. B05B 7/0043; B01F 5/0697; B01F 3/04446; B01F 5/0612; B01F 2215/004; B60S 3/04

USPC .......................................................... 366/337
See application file for complete search history.

(56) References Cited

U.S. PATENT DOCUMENTS

| | | | | |
|---|---|---|---|---|
| 2,183,561 | A * | 12/1939 | Hamblin ................. | A62C 5/024 261/76 |
| 9,132,393 | B1 * | 9/2015 | Ross ...................... | B01F 5/0666 |
| 2014/0291873 | A1 * | 10/2014 | McClimond ........ | B01F 3/04992 261/95 |
| 2016/0158589 | A1 * | 6/2016 | Pulz ..................... | A62D 1/0071 366/348 |

FOREIGN PATENT DOCUMENTS

FR 2010006 A1 * 2/1970 ........... A62C 31/005

* cited by examiner

*Primary Examiner* — Huy Tram Nguyen
(74) *Attorney, Agent, or Firm* — Laurence A. Greenberg; Werner H. Stemer; Ralph E. Locher

(57) ABSTRACT

Embodiments of the present invention address deficiencies of the art in respect to foam generation and provide a novel and non-obvious insert for a foam generation apparatus. In an embodiment of the invention, an insert for a foam generator includes a cylindrical cage and a multiplicity of fins extending from an interior portion of the cage towards a longitudinal axis of the cage, and at an inclined angle relative to the axis. The insert further includes at least one pad contacting the interior portion of the cage in a volume defined by opposing sets of the fins and the interior portion of the cage.

7 Claims, 3 Drawing Sheets

FOAM GENERATOR INSERT

CROSS REFERENCE TO RELATED APPLICATIONS

This application claims the benefit under 35 U.S.C. § 119(e) of U.S. Provisional Application No. 62/488,477, filed Apr. 21, 2017, the entire teachings of which are incorporated herein by reference.

BACKGROUND OF THE INVENTION

Field of the Invention

The present invention relates to automated vehicle washing systems and more particularly to foam generators for use in automated vehicle washing systems.

Description of the Related Art

Foam generators make foam when mixed in a housing with compressed air and a pressurized chemicals. The generated form then can be discharged to chemical distribution equipment, which in turn applies the foamed chemical onto vehicles, for the purpose of cleaning and protecting the exterior surfaces of vehicles.

BRIEF SUMMARY OF THE INVENTION

Embodiments of the present invention address deficiencies of the art in respect to foam generation and provide a novel and non-obvious insert for a foam generation apparatus. In an embodiment of the invention, an insert for a foam generator includes a cylindrical cage and a multiplicity of fins extending from an interior portion of the cage towards a longitudinal axis of the cage, and at an inclined angle relative to the axis. The insert further includes at least one pad contacting the interior portion of the cage in a volume defined by opposing sets of the fins and the interior portion of the cage. In one aspect of the embodiment, the fibrous pads have a cylindrical shape with a diameter that is substantially equivalent to an interior diameter of the cage. In another aspect of the embodiment, the insert also includes a handle affixed to a top portion of the cage. In particular, the handle may include a gripping portion at one end of a shaft and two arms extending laterally from an opposite end of the shaft, with a distal end of each of the arms locking into a corresponding keyhole defined at the top portion of the cage. As well, the distal end of each of the arms is flush to an exterior surface of the cage when locked into the corresponding keyhole. In yet another aspect of the embodiment, the cage includes two semi-cylindrical portions affixed to one another with a fastener. In this regard, the fastener may be a snap.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
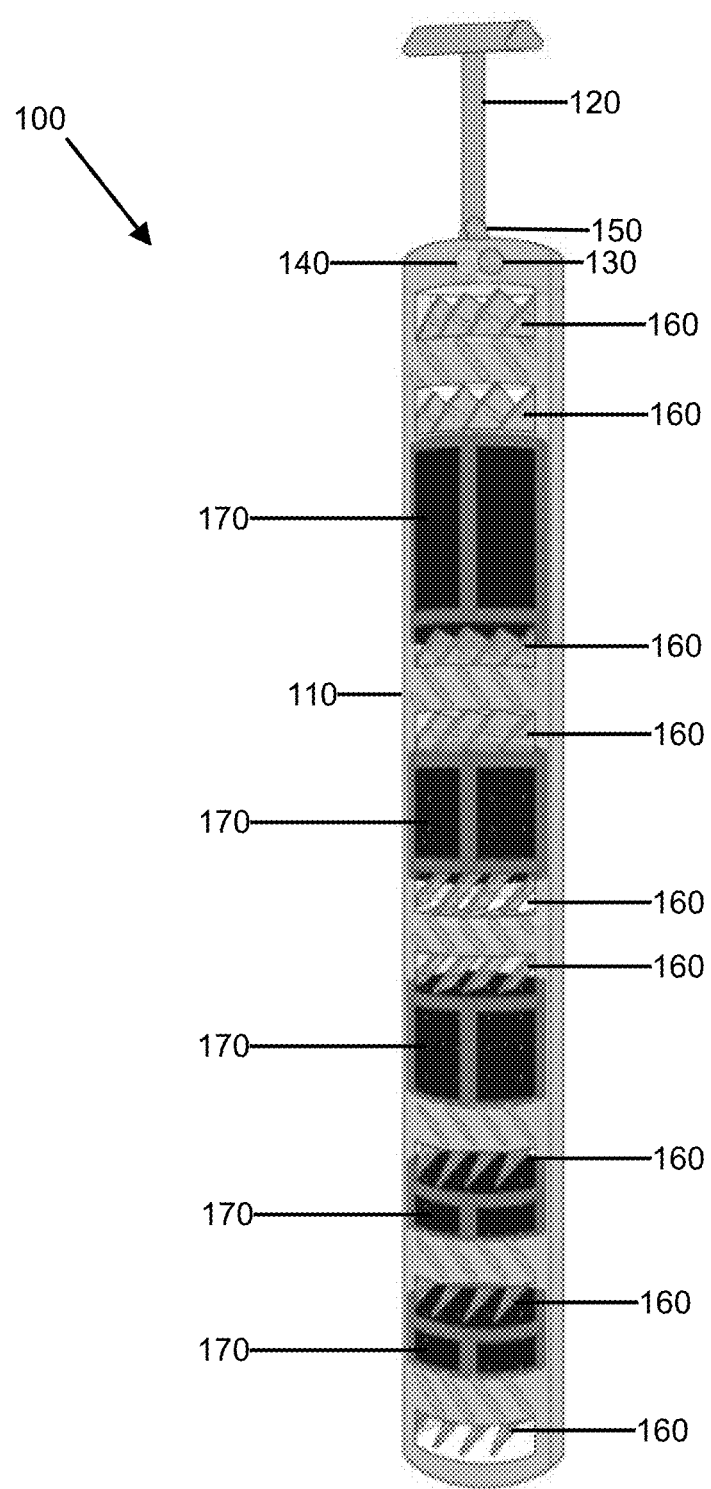
FIG. 1 is a perspective view of a molded assembled foam generator insert.

Embodiments of the invention provide for an insert for a foam generator apparatus. The foam generator insert is a molded sub-assembly that can be installed in many forms of encasements of a foam generator. Once installed the insert agitates fluid or chemicals passed through the foam generator and creates foam. The foam generator insert can be varying sizes and materials based on type and size of equipment. In further illustration, FIG. 1 is a perspective view of a molded assembled foam generator insert. As shown in FIG. 1, an insert 100 for a foam generator includes a cylindrical cage 170 with a handle 120 affixed to a top portion of the cage 170 by way of flush mounted distal ends 130 of opposite arms 150 of the handle 120 in corresponding keyholes 140 defined at the top portion of the cylindrical cage 170. A multiplicity of fins 160 extend from an interior portion of the cage 170 towards a longitudinal axis of the cage 170. As can be seen, the fins 160 may be angled at an incline relative to the longitudinal axis of the cage 170. Finally, different fibrous pads 170 are fitted within different volumes of the cage 170 defined by opposing sets of the fins 160 and the interior portion of the cage 170.

Figure 2:
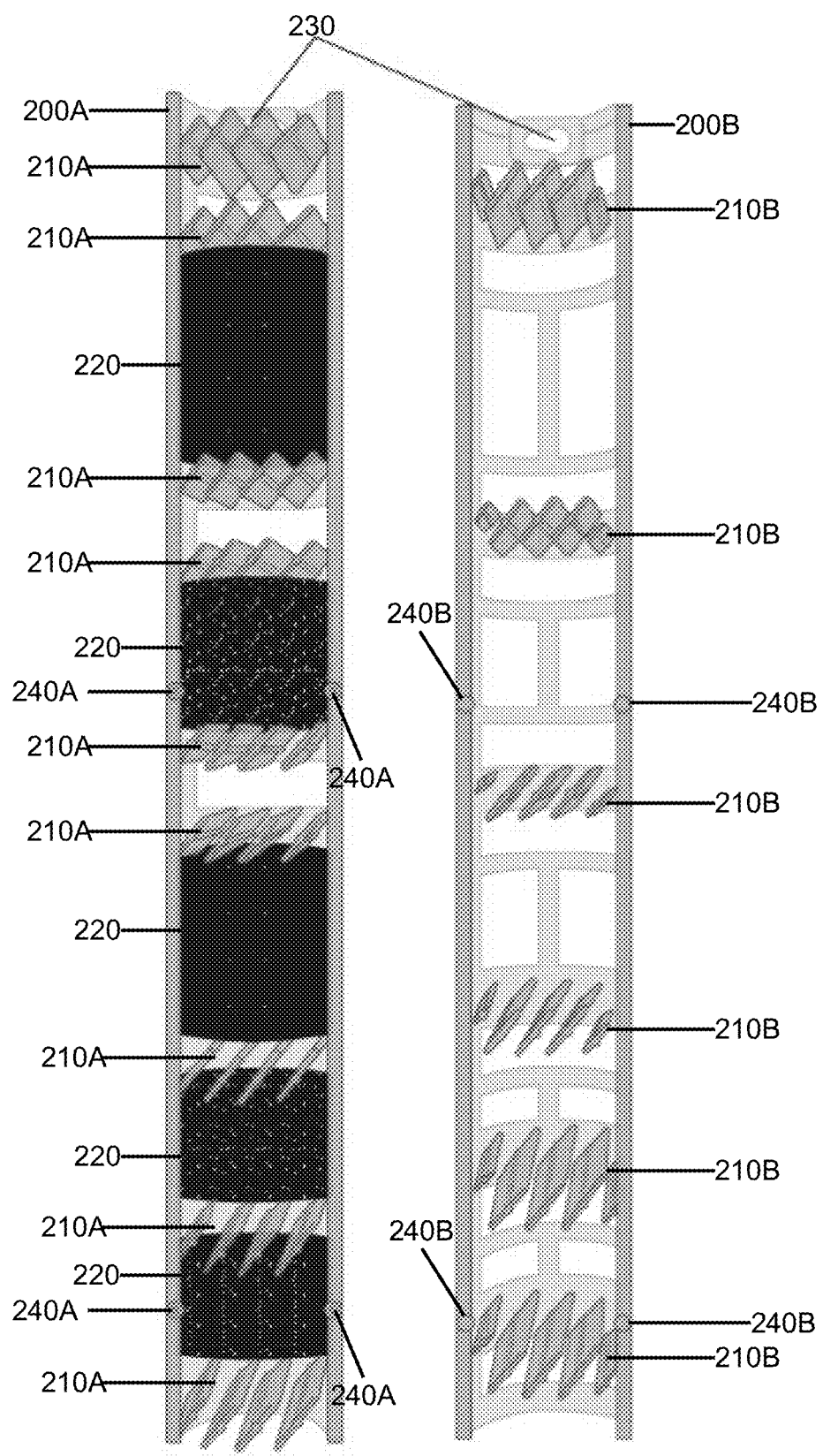
FIG. 2 is a perspective view of separated portions of the molded assembled foam generator insert with molded fins and fibrous pads; and, FIG. 3 is a frontal view of a molded handle for removal of the foam generator insert.

In one aspect of the embodiment, the cage 100 may be formed of two opposite semi-cylinders. In more particular illustration, FIG. 2 is a perspective view of separated portions of the molded assembled foam generator insert with molded fins and fibrous pads. As shown in FIG. 2, the cage is defined by two opposite semi-cylinders 200A, 200B. In both semi-cylinders 200A, 200B, an array of fins 210A, 210B are defined as an integral part thereof with each of the fins 210A, 210B having been molded to extend from an interior portion of a corresponding one of the cylinders 200A, 200B perpendicularly and an inclined angle. As further can be seen, each set of fins 210A disposed within a first semi-cylinder 200A is positioned longitudinally differently than the fins 210B of the second semi-cylinder 200B so as to permit the fixation of the semi-cylinders 200A, 200B together to form the cage, for example by operation of fasteners 240A, 240B which are shown in FIG. 2 as pairs of snaps. Finally, the fins 210A, 210B, when the semi-cylinders 200A, 200B are coupled together, define different volumes in which the fibrous pads 220 are secured. Optimally, the fibrous pads 220 are cylindrical in form with a diameter substantial equivalent to an interior diameter of the cage.

Figure 3:
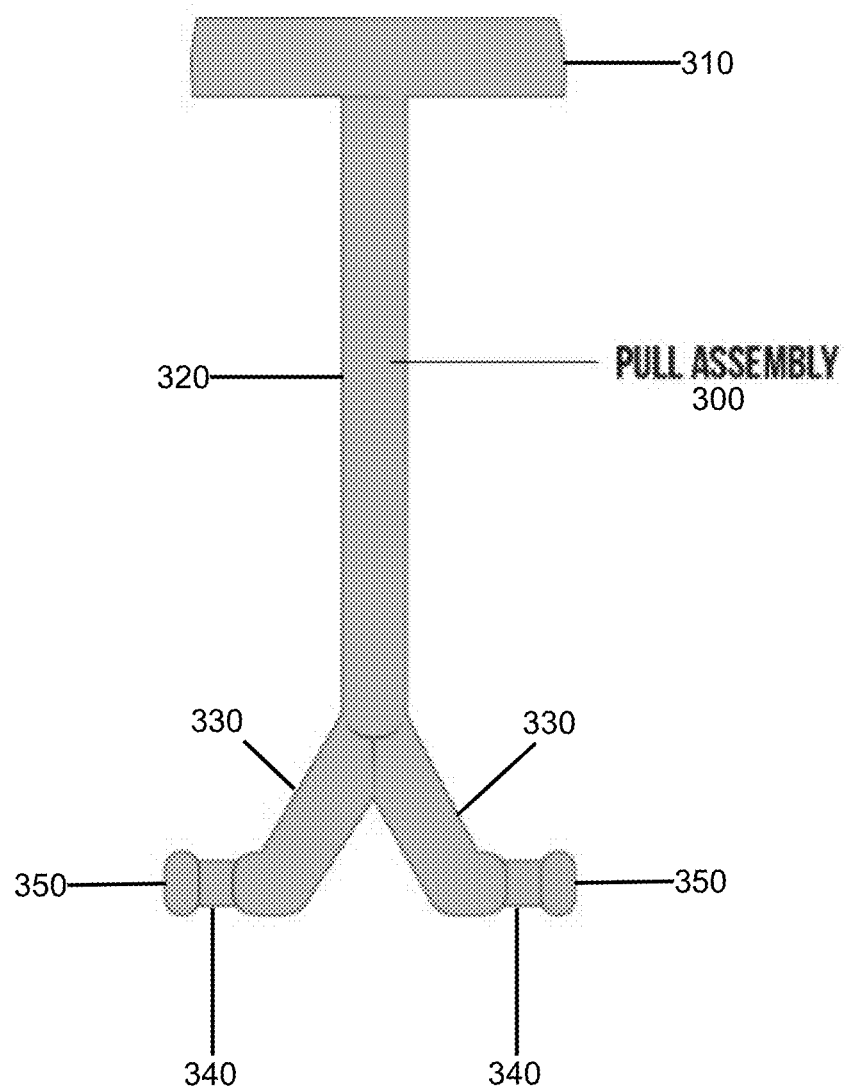

Of note, a handle may be secured to the cage so as to permit the insertion and extraction of the cage 230 from a housing of a foam generator. So as to permit the securing of the handle to the cage, a keyhole 230 is defined at a top portion of each of the semi-cylinders 200A, 200B. In yet further illustration, FIG. 3 is a frontal view of a molded handle for removal of the foam generator insert. As can be seen in FIG. 3, the handle is a pull assembly 300 that includes a gripping portion 310, a shaft 320 and two arms 330 extending from an end of the shaft 320 opposite to that of the gripping portion 310. A distal end 350 of each arm 330 is defined so as to permit insertion thereof into a corresponding keyhole and to then become flushly mounted with an exterior portion of the cage defining the keyhole. To that end, a constructed portion of the arm 330 is formed to be approximately the diameter of the keyhole and the distal end is formed to have a diameter slightly larger than the diameter of the keyhole so as to permit a snap fit within the keyhole.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, but do not preclude the presence or addition of one or more other features. As well, the corresponding structures, materials, acts, and equivalents of all means plus function elements in the claims below are intended to include any structure, material, or act for performing the function in combination with other claimed elements as specifically claimed. Finally, the description of the present invention has been presented for purposes of illustration and description; but, the description of the invention is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. An insert for a foam generator comprising:
   a cylindrical cage;
   a multiplicity of fins extending from an interior portion of the cage towards a longitudinal axis of the cage, and at an inclined angle relative to the axis; and,
   at least one pad contacting the interior portion of the cage in a volume defined by opposing sets of the fins and the interior portion of the cage.

2. The insert of claim 1, wherein the fibrous pads have a cylindrical shape with a diameter that is substantially equivalent to an interior diameter of the cage.

3. The insert of claim 1, further comprising a handle affixed to a top portion of the cage.

4. The insert of claim 1, wherein the handle comprises a gripping portion at one end of a shaft and two arms extending laterally from an opposite end of the shaft, a distal end of each of the arms locking into a corresponding keyhole defined at the top portion of the cage.

5. The insert of claim 4, wherein the distal end of each of the arms is flush to an exterior surface of the cage when locked into the corresponding keyhole.

6. The insert of claim 1, wherein the cage comprises two semi-cylindrical portions affixed to one another with a fastener.

7. The insert of claim 6, wherein the fastener is a snap.

* * * * *